United States Patent
Lohrentz et al.

(10) Patent No.: US 7,028,459 B2
(45) Date of Patent: Apr. 18, 2006

(54) TRIPLE WINDROWING METHOD AND APPARATUS

(75) Inventors: Randy Lohrentz, Buhler, KS (US); Dwight E. Nickel, Newton, KS (US); Ben G. Nolt, LeRoy, MN (US)

(73) Assignee: ACCO Corporation, Duluth, GA (US)

( * ) Notice: Subject to any disclaimer, the term of this patent is extended or adjusted under 35 U.S.C. 154(b) by 0 days.

(21) Appl. No.: 10/752,640

(22) Filed: Jan. 7, 2004

(65) Prior Publication Data

US 2005/0120696 A1 Jun. 9, 2005

Related U.S. Application Data

(60) Provisional application No. 60/526,928, filed on Dec. 4, 2003.

(51) Int. Cl.
*A01D 43/00* (2006.01)
*A01D 57/26* (2006.01)
*A01D 57/28* (2006.01)
*A01D 57/30* (2006.01)

(52) U.S. Cl. ...................................................... 56/192

(58) Field of Classification Search ................ 56/192, 56/14.9, 378, 14.5, 16.4 R, DIG. 21, 193, 56/10.8, 15.5, 15.9, 10.7, 10.6, 11.9
See application file for complete search history.

(56) References Cited

U.S. PATENT DOCUMENTS 2,667,731 A * 2/1954 Nerness ........................ 56/372
2,761,270 A * 9/1956 Blaser et al. ................. 56/370

(Continued)

FOREIGN PATENT DOCUMENTS

FR 2483736 A * 12/1981

*Primary Examiner*—Árpád Fábián Kovács
(74) *Attorney, Agent, or Firm*—Hovey Williams LLP

(57) ABSTRACT

A harvester suitable for triple windrowing operations has a cross-conveyor located behind the harvesting header for intercepting a stream of severed materials projected rearwardly from the header as the machine moves through the field. The cross-conveyor may be maintained in a raised or lowered position independently of the header so that, when the cross-conveyor is raised, the stream of severed materials from the header can be projected straight back underneath the raised conveyor to fall onto the ground generally in line with the header. For triple windrowing, a first pass is made with the cross-conveyor raised so that the first deposit is made directly behind the header on the mowed strip of the first pass. The first pass is carried out at a distance inwardly from the uncut edge of standing materials that is equal to or less than the width of the header so that a band of standing materials is left along one side of the mowed strip and the main remaining body of standing materials is presented along the other side. During the second pass, either through the main body or the band of materials depending upon the direction at which the cross-conveyor is angled rearwardly, the cross-conveyor is in its lowered position so as to intercept the stream of materials from the header, convey them laterally, and project them into a second deposit of material in the mowed strip from the first pass. The third pass is then made with the cross-conveyor also in a lowered position to form a third deposit of materials in the first mowed strip. When all three passes are complete, a total of three deposits of material are presented in the mowed strip from the first pass. An extension conveyor in the discharge area of the cross-conveyor accelerates the crop materials and is cocked upwardly to provide additional loft to the materials, thus enabling the materials to travel the extra distances needed to carry out the triple windrowing process.

7 Claims, 9 Drawing Sheets

U.S. PATENT DOCUMENTS

| | | |
|---|---|---|
| 3,059,403 A | 10/1962 | Bamford et al. |
| 3,221,484 A | 12/1965 | Van Der Lely |
| 3,383,844 A | 5/1968 | Glass et al. |
| 3,422,953 A * | 1/1969 | Gates et al. ............... 209/644 |
| 3,523,410 A | 8/1970 | Taylor et al. |
| 3,911,649 A | 10/1975 | Scarnato et al. |
| 3,928,955 A | 12/1975 | Case |
| 3,976,143 A | 8/1976 | Rodger |
| 4,022,005 A * | 5/1977 | Case ............................ 56/372 |
| 4,121,667 A * | 10/1978 | Curl ............................ 171/110 |
| 4,174,755 A * | 11/1979 | Siri ............................. 171/27 |
| 4,257,218 A * | 3/1981 | McRobert ................. 56/327.1 |
| 4,274,247 A | 6/1981 | Schmidt et al. |
| 4,392,533 A * | 7/1983 | Bittle ........................... 171/14 |
| 4,590,751 A * | 5/1986 | Stephenson .................. 56/192 |
| 4,809,490 A | 3/1989 | Swanson |
| 4,910,951 A | 3/1990 | Reilly et al. |
| 5,203,154 A * | 4/1993 | Lesher et al. .................. 56/366 |
| 5,231,826 A * | 8/1993 | Jennings ...................... 56/11.4 |
| 6,145,289 A * | 11/2000 | Welsch et al. ................. 56/192 |
| 6,164,051 A * | 12/2000 | van der Lely et al. ........ 56/367 |
| 6,205,757 B1 * | 3/2001 | Dow et al. ..................... 56/366 |
| 6,415,590 B1 * | 7/2002 | Lohrentz ....................... 56/192 |
| 6,715,274 B1 * | 4/2004 | Peeters et al. ................. 56/376 |
| 6,862,873 B1 | 3/2005 | Franet |

* cited by examiner

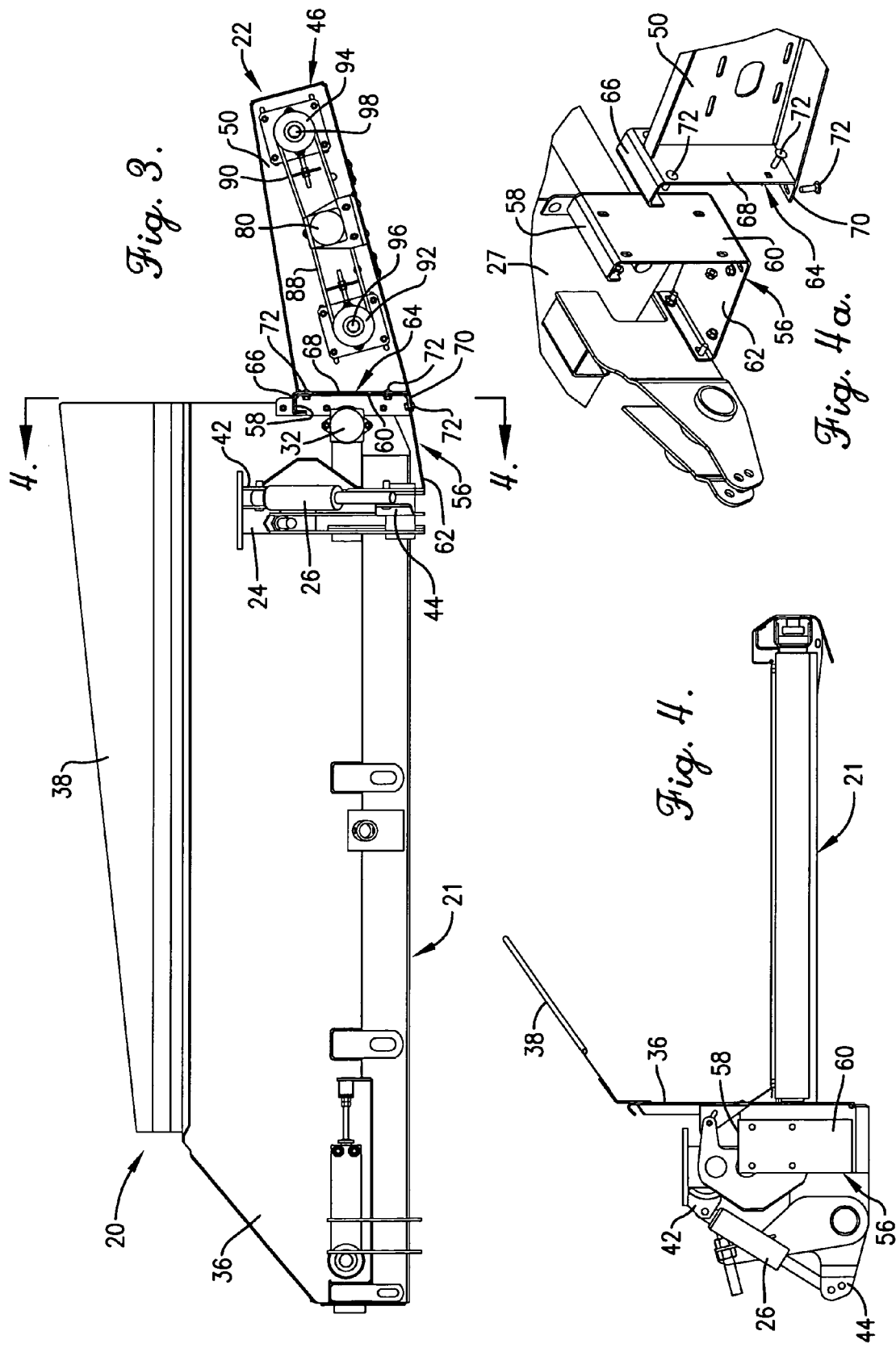

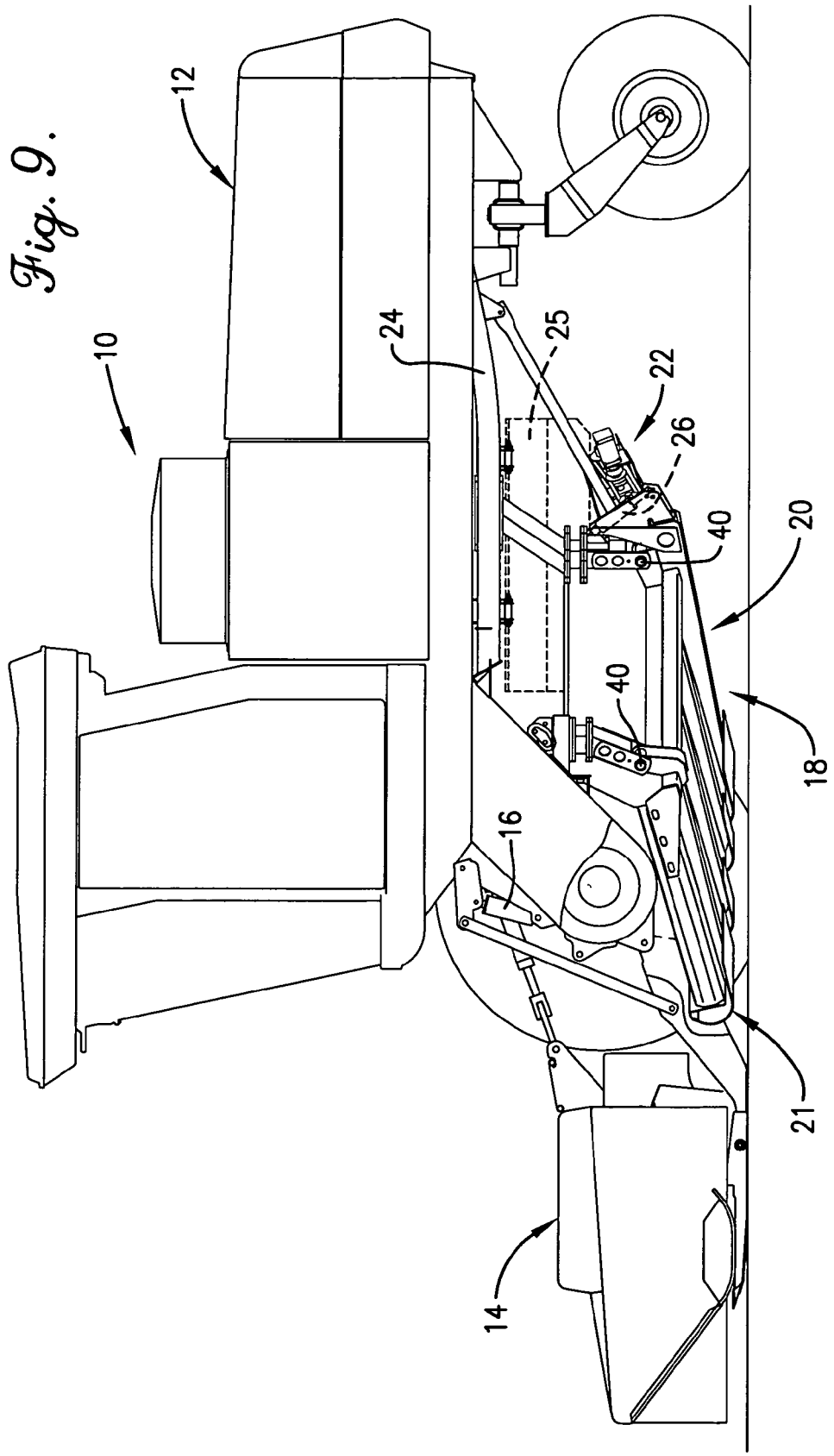

TRIPLE WINDROWING METHOD AND APPARATUS

RELATED APPLICATIONS

This application claims the priority benefit of provisional application Ser. No. 60/526,928 filed Dec. 4, 2003 and titled "Multi/Triple Windrower Attachment For a Self Propelled Tractor."

TECHNICAL FIELD

The present invention relates to harvesters and, more particularly, to harvesting equipment of the type that is capable of producing so-called triple windrows to make the most efficient use of the high capacity available in large equipment such as big square balers or self-propelled forage harvesters that subsequently pick up and process the windrowed materials.

BACKGROUND AND SUMMARY

Prior U.S. Pat. No. 6,415,590 assigned to the assignee of the present invention discloses and claims a harvester that is capable of making double windrows. Crop materials are severed from the ground as the harvester makes a first pass, and a stream of the severed materials is projected rearwardly from the harvesting header onto a cross-conveyor that moves the intercepted materials laterally of the machine and deposits them back onto the ground generally alongside the edge of the standing material that remains in the field. Then, on the next pass in the opposite direction, the harvester uses the cross-conveyor to lay down a second deposit of severed materials alongside or in association with the first deposit of materials. This produces a collection of merged, side-by-side, or at least relatively closely associated windrows that permits a high capacity machine such as a big square baler or a forage harvester to ingest twice the volume of crop materials during each of its passes through the field than would otherwise be true, leading to higher operating efficiencies.

Some machines have such large capacity that it would be desirable to provide triple windrows. Accordingly, one important object of the present invention is to provide a harvesting method and apparatus in which triple windrows can be formed on-the-go by the same machine that severs the standing crop from the field. In other words, it is an important goal of the present invention to eliminate the need for subsequent raking or merging equipment and to provide the mowing or crop severing functions and the triple windrow-making functions all in the same machine. Preferably, a conditioning function is also carried out by the machine.

This objective is obtained in the present invention using a harvester having a cross-conveyor that is capable of intercepting the stream of severed materials from the header of the machine, conveying such materials laterally, and projecting them a substantial distance laterally into a mowed strip from a previous pass through the field. The cross-conveyor is readily raisable and lowerable between operating and standby locations from the tractor seat to permit severed materials to either land on the conveyor or pass beneath it, as determined by the operator during each pass.

During a first pass in the procedure, the operator positions the machine at a distance inwardly from the uncut edge of the standing crop materials, such distance preferably being approximately the same as or slightly less than the width of cut normally taken by the header. As the first pass is made, the cross-conveyor is maintained in its raised position so that severed crop materials issuing from the header are projected rearwardly therefrom in a stream that passes beneath the raised cross-conveyor and drops to the ground within the mowed strip immediately behind the advancing header. This produces a first deposit of severed crop materials within the mowed strip and leaves an unmowed band of standing crop materials along one side of the mowed strip. A normally larger body of standing materials remains along the other side of the mowed strip.

When the operator completes the first pass, he turns the machine around at the end of the field, lowers the cross-conveyor, and commences a second pass in the opposite direction through either the band of standing materials or the larger body of standing materials, depending upon whether the cross-conveyor is arranged to discharge to the right or to the left. Thus, as the second pass is carried out, the severed materials issuing from the header are intercepted by the cross-conveyor, are moved laterally to the outer extremity of the machine, and are projected into the mowed strip from the first pass to associate with the first deposit of severed materials. Thus, when the second pass has been completed, the mowed strip from the first pass contains two ribbon-like deposits of severed crop materials.

After completing the second pass, the operator again turns the machine around and commences a third pass in the original direction through either the band of standing materials or the main body of standing materials, again depending upon whether the cross-conveyor has been configured for right-hand or left-hand discharge. During the third pass the cross-conveyer again functions to intercept the severed materials from the header, deliver them laterally outwardly, and project them through the air a sufficient distance that they fall to the ground in relatively close association with the already existing first and second deposits within the first mowed strip. Consequently, when the third pass is completed, the mowed strip from the first pass contains three deposits of severed materials.

In one form of the invention, a double-windrowing cross-conveyor of the type disclosed in U.S. Pat. No. 6,415,590 may be modified to adapt it for triple windrowing. The conveyor as disclosed in the '590 patent includes a conveying surface presented by an endless draper belt that terminates just inboard of the adjacent drive wheel of the tractor of the harvester. In order to adapt this conveyor to project materials further outwardly in accordance with triple windrowing concepts, an extension or supplemental conveyor may be added on to the discharge end of the existing conveyor so that the discharge end of the extension conveyor approximately coincides with the corresponding drive wheel on the tractor but, in any event, is long enough to project the materials outwardly beyond the drive wheel further than previously possible with the double windrowing conveyor. It has been found desirable to run the extension conveyor at a faster speed than the main conveyor so that the crop materials are accelerated as they are projected outwardly by the extension conveyor. Moreover, it has been found beneficial to cock the extension conveyor somewhat upwardly at an angle to the main conveyor so as to increase the loft and raise the trajectory of the crops as they travel away from the harvester.

In one preferred form of the invention, the extension conveyor takes the form of a series of driven rollers extending transversely of the path of travel of the materials on the conveyor, such rollers having full length, metal paddles about their periphery to aggressively engage and propel the severed materials along their way. By driving the rollers through a hydraulic motor separate from the drive associated with the main conveyor, the extension conveyor can be fairly easily mounted on and removed from the main conveyor for changing between triple windrowing and double windrowing operations as may be necessary or desirable.

BRIEF DESCRIPTION OF THE DRAWINGS

FIG. 3 is a rear elevational view of the cross-conveyor;

FIG. 4 is an end elevational view of the cross-conveyor with the extension conveyor removed to reveal details of construction, such view being taken generally along sight line 4—4 of FIG. 3;

FIG. 4a is an enlarged, fragmentary, isometric exploded view of some of the bracketry for removably attaching the extension conveyor to the main conveyor;

FIG. 9 is a left side elevational view of the harvester similar to FIGS. 7 and 8 but showing both the header and the cross-conveyor in lowered working positions;

FIG. 10 is a front elevational view of a deflector that is typically used only when the extension conveyor is removed and the main conveyor is utilized for double windrowing, the deflector being maintained in its raised, inoperative position shown in phantom lines during triple windrowing operations.

DETAILED DESCRIPTION

Figure 1A:
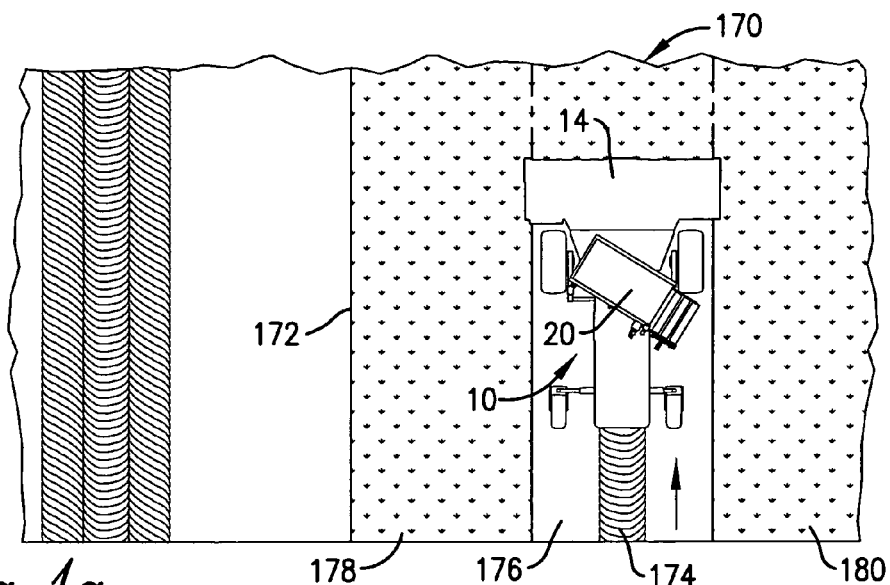
FIGS. 1a, 1b and 1c are schematic top plan views illustrating one embodiment of a triple windrowing method in accordance with the principles of the present invention.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Although the present invention has been illustrated and described herein in connection with a self-propelled windrower, it will be appreciated by those skilled in the art that the principles of this invention may also be utilized in a pull-type machine. Furthermore, the harvesting header may include rotary or sickle cut-offs without departing from the principles of the present invention, and the severed crop materials may or may not be conditioned before being returned to the ground following severance. In the event such conditioning is desired, a variety of mechanisms for carrying out such process, including counter rotating conditioning rolls or spoked conditioners, can be utilized. Additionally, the term "windrow" and variations thereof used throughout the specification and claims hereof are to be interpreted in a broad sense to include not only windrows, but also swaths and other types of crop formations created when severed crop materials are deposited on a mowed field, as well understood by those skilled in the art.

With initial reference to FIGS. 1–10, it will be seen that in the illustrated embodiment the harvester 10 includes a self-propelled tractor 12 and a header 14 attached to the front end of tractor 12. As well understood by those skilled in the art, header 14 is mounted on tractor 12 for up and down swinging movement between a raised, transport position in FIG. 7 and a lowered, working position in FIGS. 8 and 9. A header lift cylinder 16 shown in FIGS. 8 and 9 (one of two such cylinders) is used to raise and lower header 14.

Generally speaking, header 14, as well understood by those skilled in the art, is operable when lowered to sever standing crop materials from the ground as the harvester moves through the field, to condition such materials if conditioning mechanism is present on the machine, and to project the severed materials rearwardly in a stream beneath tractor 12.

A triple windrow attachment is denoted by the numeral 18 and broadly includes a cross-conveyor 20 having a main conveying portion 21 and an extension conveyor portion 22, a frame 24 for securing cross-conveyor 20 to tractor 12, and a lift cylinder 26 for raising and lowering cross-conveyor 20. A deflector 25 that is raised and lowered by an operating cylinder 25a (FIG. 10) is maintained in its fully raised position shown in phantom lines in FIG. 10 and in the other figures because deflector 25 is rarely used during triple windrowing operations. When extension conveyor 22 is detached from main conveyor portion 21, the harvester 12 is adapted for double windrowing operations only, at which time deflector 25 is used as set forth in U.S. Pat. No. 6,415,590, the disclosure which is hereby incorporated by reference into the present specification.

Figure 2:
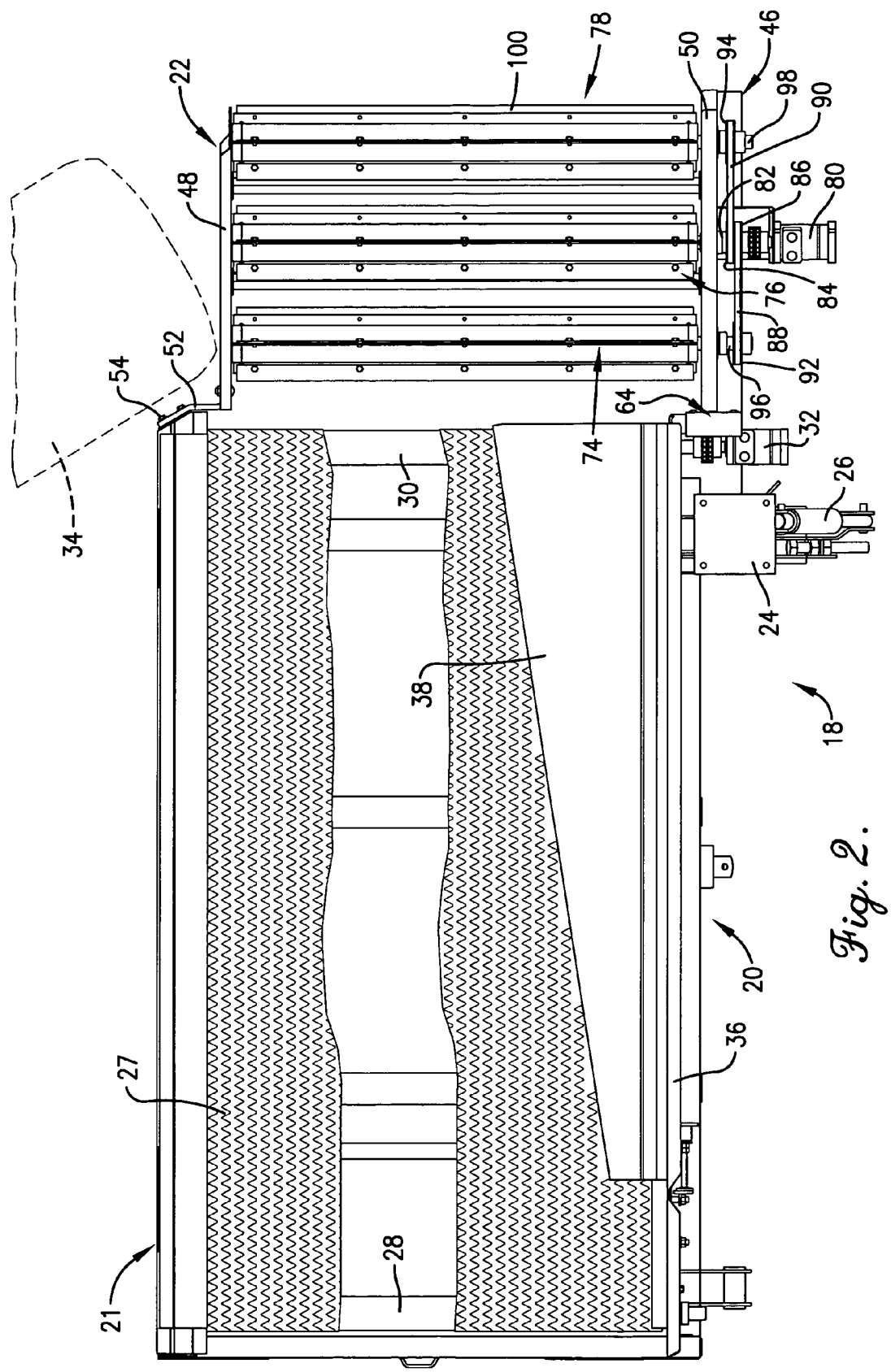
FIG. 2 is a top plan view of one embodiment of a triple windrowing cross-conveyor constructed in accordance with the principles of the present invention, a ground wheel of the harvester on which the cross-conveyor is mounted being fragmentarily illustrated and shown in phantom lines.
Figure 5:
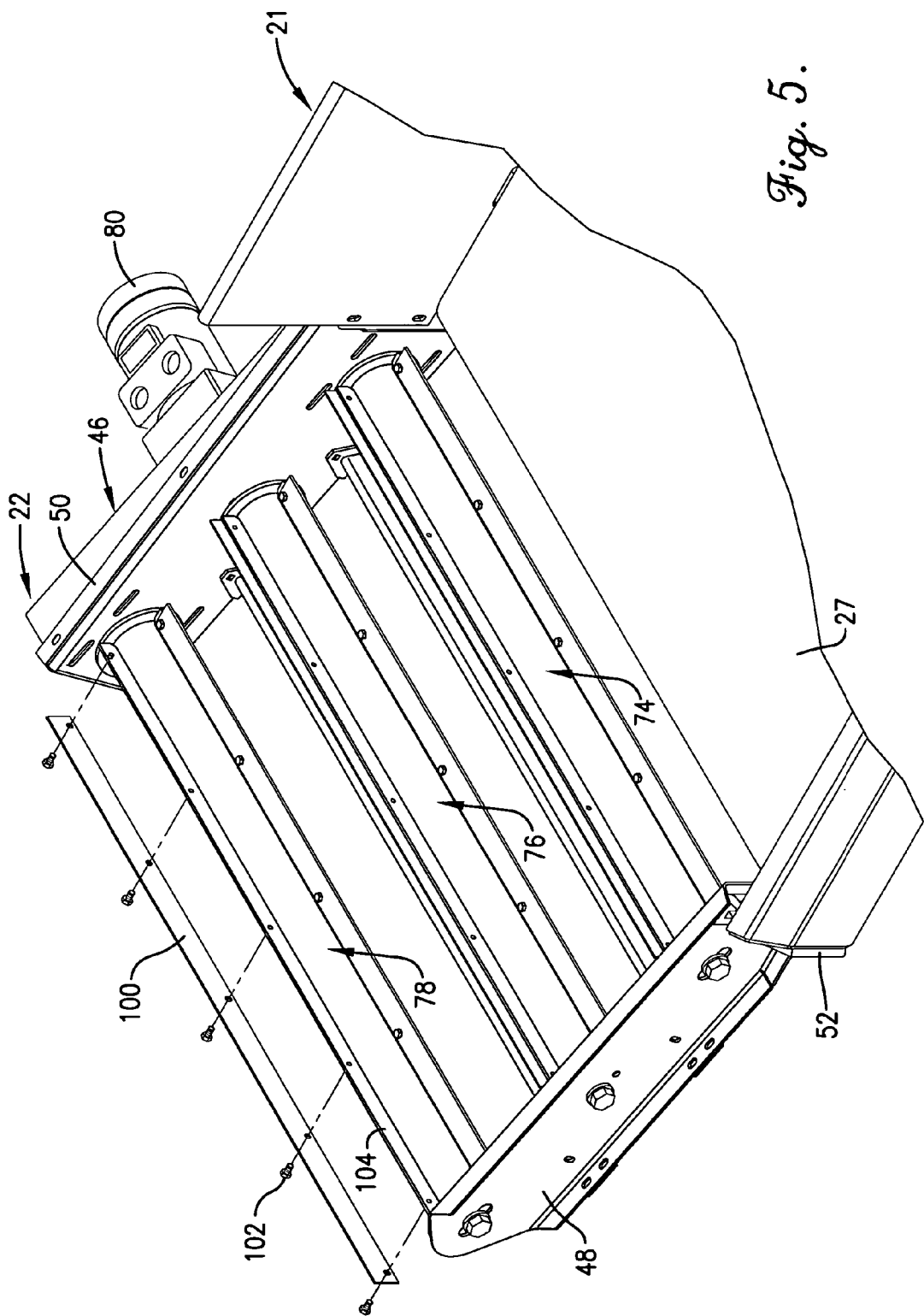
FIG. 5 is an enlarged, fragmentary isometric view of the discharge end of the cross-conveyor illustrating in particular components of the extension conveyor, portions one roller thereof being illustrated in an exploded showing.
Figure 6:
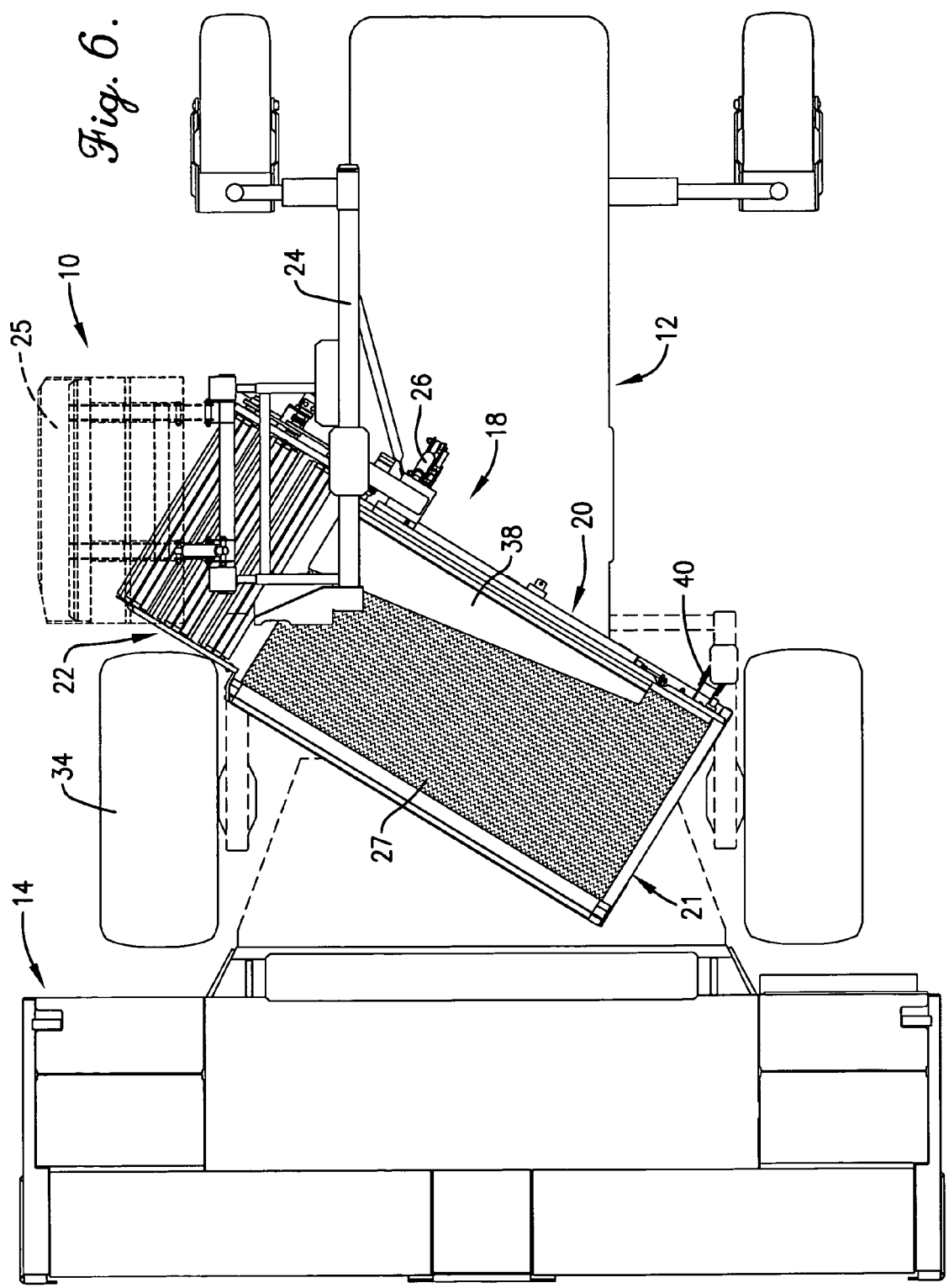
FIG. 6 is a schematic, top plan illustration of the harvester with the cross-conveyor installed and illustrated in a raised position.

Main conveyor portion 21 of cross-conveyor 20 is generally rectangular as viewed in top plan as illustrated in particular in FIGS. 2 and 6. Cross-conveyor 20 is mounted in an oblique orientation with respect to the path of travel of harvester 10 as illustrated particularly in FIGS. 2 and 6. Main conveyor 21 utilizes a wide, flat, endless draper belt 27 to provide a top conveying surface for crop materials from header 14, such belt 27 being wrapped around a pair of rollers 28 and 30 at opposite ends of main conveyor 21 and driven during operation in a rightward direction as viewed in FIG. 6. Roller 30 is driven by a hydraulic motor 32 (FIGS. 2 and 3). Main conveyor 21 terminates just inboard of the right drive wheel 34 of tractor 12 as illustrated particularly in the plan views of FIGS. 2 and 6. An upright, rear wall 36 along the rear extremity of main conveyor 21 helps to intercept the stream of crop materials emanating from header 14 such that the materials are caused to drop onto the belt 27 rather than pass over the top thereof. Rear wall 36 has a somewhat triangular in plan overhead deflector 38 that assists in intercepting the crop materials.

Figure 7:
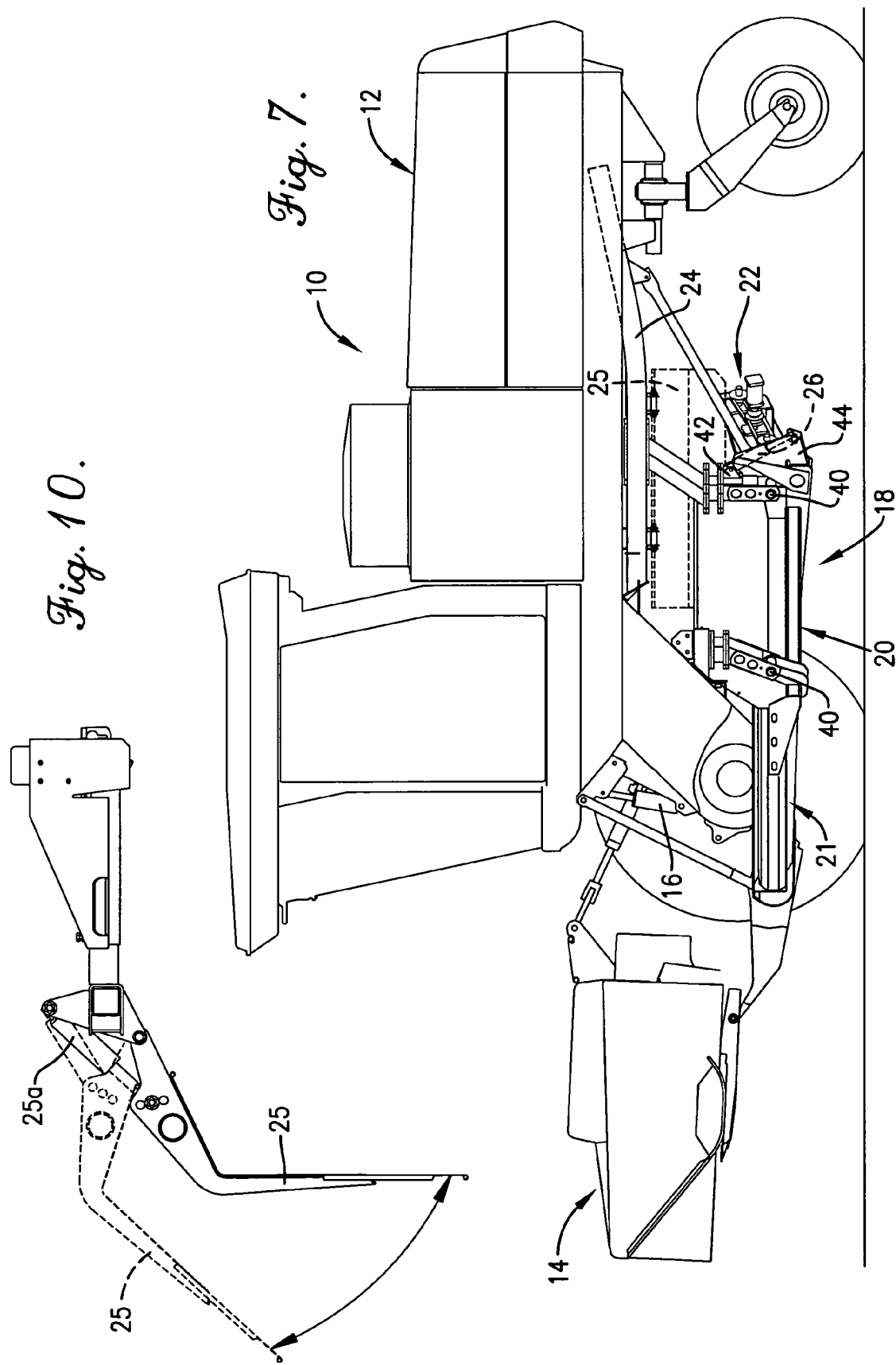
FIG. 7 is a left side elevational view of the harvester with the cross-conveyor in its raised position, the harvesting header also being shown in a raised position.
Figure 8:
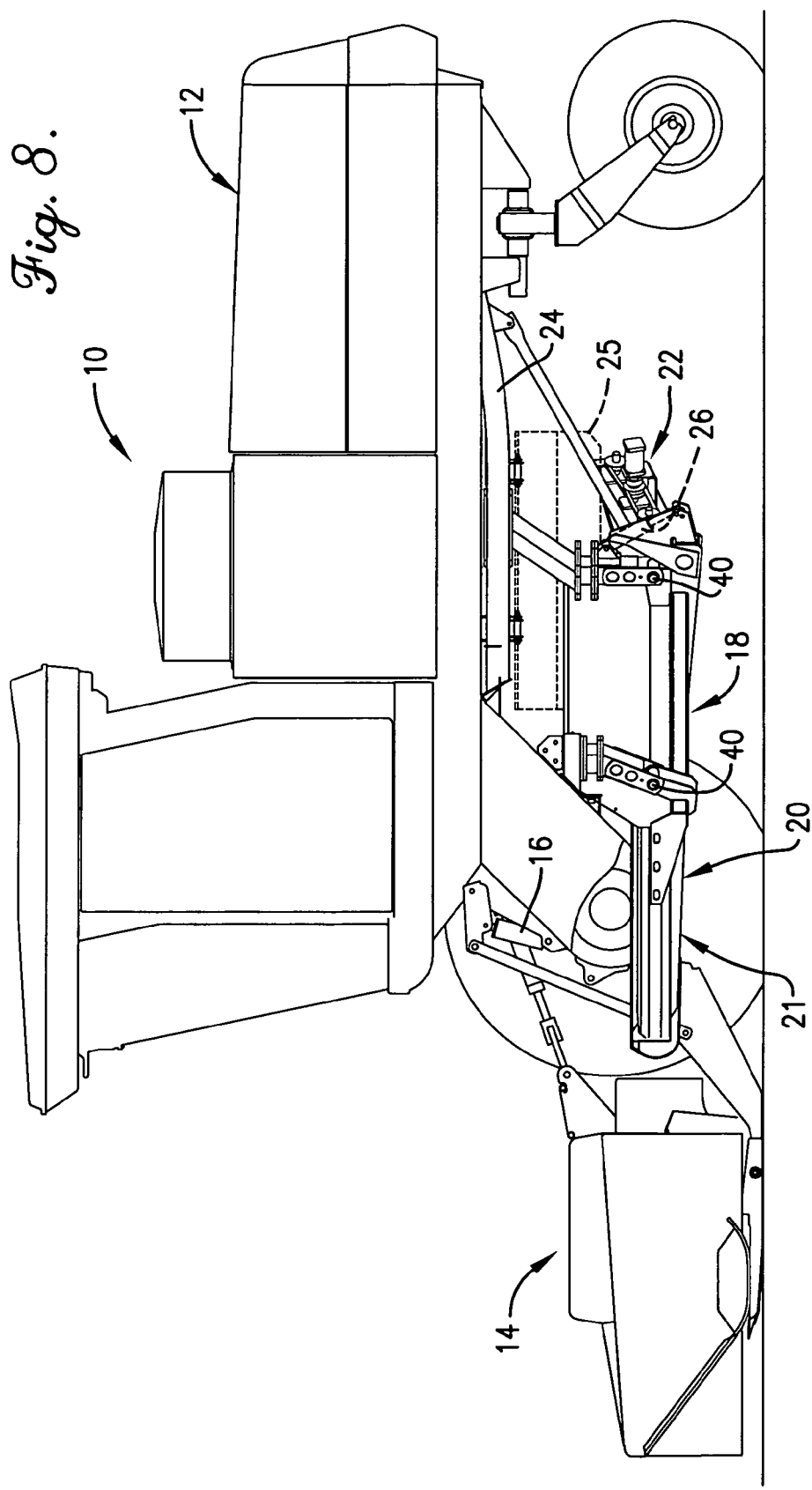
FIG. 8 is a left side elevational view of the harvester similar to FIG. 7 with the cross-conveyor raised and the header lowered into an operating position.

Cross-conveyor 20 is secured to frame 24 by a pair of aligned pivots 40 that permit cross-conveyor 20 to be swung up and down in a hinging motion between a raised, horizontal position as shown in FIGS. 7 and 8, and a lowered, downwardly and forward inclined operating position as illustrated in FIG. 9. Lift cylinder 26 for cross-conveyor 20 is connected between a rearwardly extending lug 42 (FIG. 7) on frame 24 and a crank member 44 on cross-conveyor 20.

The extension conveyor 22 of cross-conveyor 20 is detachably affixed to the outer discharge end of main conveyor 21 in a position to receive materials from belt 27 and propel them laterally outwardly for a substantial distance past drive wheel 34. Extension conveyor 22 includes a frame 46 having a pair of elongated, laterally spaced apart side members 48 and 50. At the inboard end of side member 48, a laterally outwardly projecting, obliquely angled bracket 52 projects into abutting relationship with the proximal end portion of the frame of main conveyor 21, to which it is removably affixed by bolts 54. On the other side of frame 46 (see FIGS. 3, 4 and 4a in particular), a generally L-shaped mounting bracket 56 is secured to the proximal end of the frame of main conveyor 21 and projects laterally outwardly therefrom to present an upper edge 58, an upright wall 60, and a bottom wall 62. A complementally shaped hanger 64 on the inboard end of frame member 46 has a hook 66 at its upper end that fits over edge 58 of bracket 56, the hanger 54 also having an upright wall 68 that butts up against wall 60 of bracket 56. A lowermost flange 70 of hanger 64 underlies bottom wall 62 of bracket 56, and a plurality of carriage bolts 72 releasably secure hanger 64 to bracket 56.

Extension conveyor 22 further includes, in one preferred embodiment, a series of three elongated rollers 74, 76 and 78 that are disposed in side-by-side relationship and extend in a direction transverse to the direction of crop flow along cross-conveyor 20. Rollers 74–78 are journaled by members 48 and 50 of frame 46 and are driven by a hydraulic motor 80 on frame member 50. Motor 80 is operably coupled with one end of the center roller 76 for directly driving the input shaft 82 of roller 76. Two sheaves 84 and 86 are fixed to shaft 82 and supply driving power to rollers 74 and 76 via a pair of belts 88 and 90 and a pair of sheaves 92 and 94 on shafts 96, 98 of rollers 74 and 78 respectively. As illustrated perhaps best in FIG. 5, each of the rollers 74, 76 and 78 is provided with a series of projections about its periphery to aid in aggressively propelling crop materials outwardly from main conveyor 21. In one preferred embodiment of the invention, such projections take the form of elongated metal paddles 100 that project radially outwardly from equally spaced locations about the roller. In a preferred embodiment, each paddle 100 is rendered replaceably attached to its roller by virtue of being secured by bolts 102 to a rigid, radially outwardly extending, full-length mounting lug 104. Four of such mounting lugs 104 are provided around each roller 74, 76 and 78 at 90° intervals.

Although the rollers 74–78 are somewhat mutually spaced apart in the frame 46, their uppermost peripheries cooperate to in effect present an upper conveying surface for the crop materials in a somewhat similar manner to the upper conveying surface of the belt 27 of main conveyor 21. In one preferred embodiment, the rollers 74, 76 and 78 are driven at speeds that cause the effective upper conveying surface thereof to move significantly faster than the belt 27 of main conveyor 21, such as on the order of 10–20% faster. This causes the crop materials to accelerate as they encounter extension conveyor 22, thereby increasing the distance through which they travel off the end of the cross-conveyor 20. In addition, as illustrated particularly in FIG. 3, extension conveyor 22 is cocked upwardly at an angle with respect to main conveyor 21 so that the crop materials experience a heightened trajectory as they leave cross-conveyor 20.

Figure 11:
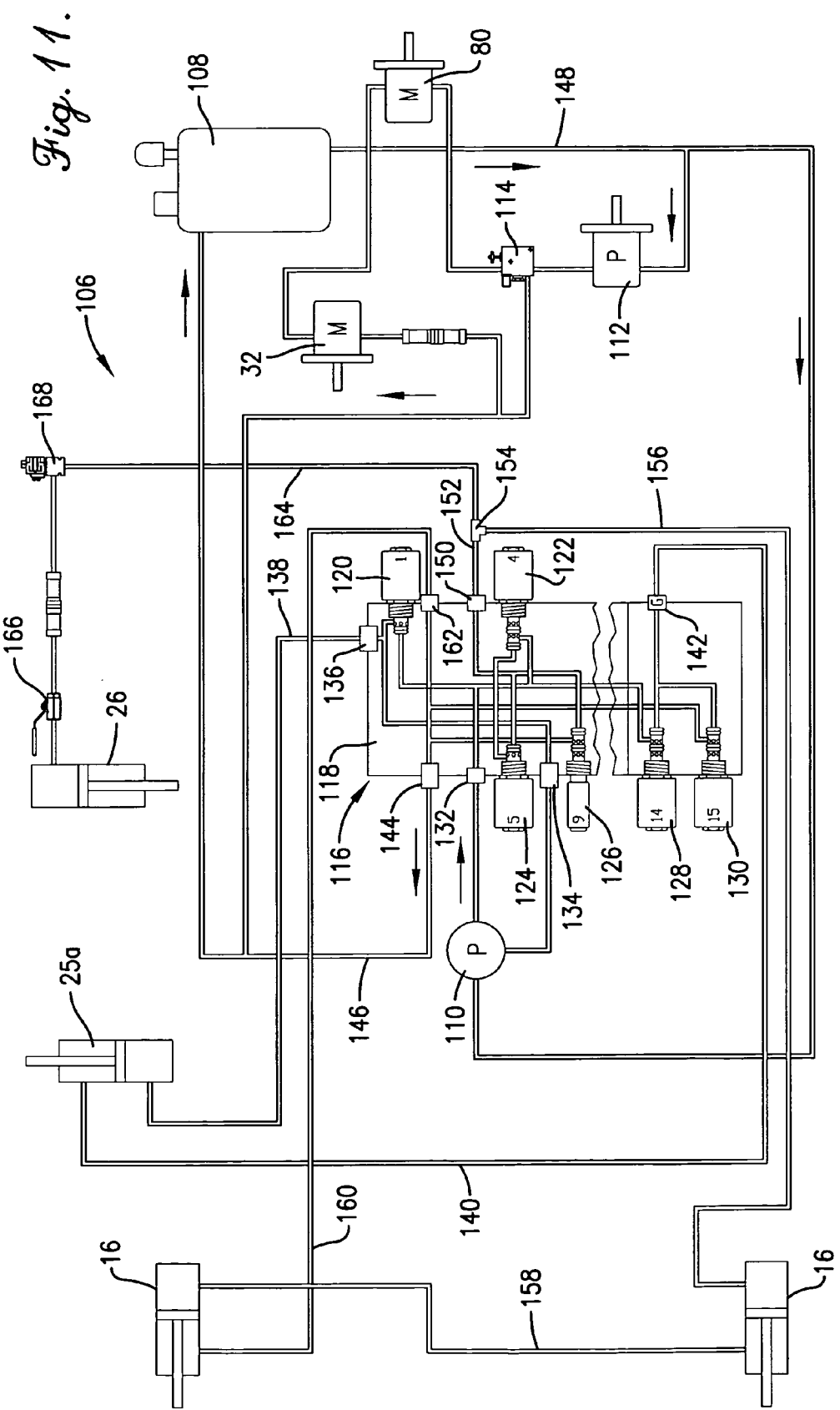
FIG. 11 is a schematic diagram of portions of the hydraulic circuitry for the harvester.

FIG. 11 is a partial, simplified schematic diagram of a hydraulic circuit for the harvester, such circuit being broadly denoted by the numeral 106. Because circuit 106 is largely conventional, it will not be described in detail. Moreover, for the sake of simplicity and ease of understanding, several components normally found within such a circuit have been omitted including, for example, ground drive motors for tractor 12, header drive motors, header flotation cylinders, and a header angle tilt cylinder.

A reservoir 108 supplies hydraulic fluid to the various operating components of circuit 106, including a main pump 110 driven by the engine (not shown) of tractor 12. Reservoir 108 also supplies oil to a second pump 112 that is belt-driven off the engine. Pump 116 is primarily responsible for supplying pressurized oil to motor 32 of main conveyor 21 and motor 80 of extension conveyor 22. An adjustable flow divider 114, operable from the tractor seat and situated upstream from motors 32 and 80, controls the amount of flow bypassing motors 32 and 80 so as to correspondingly control their speeds. Adjusting flow divider 114 adjusts both motors 32 and 80 at the same time, without changing their speeds relative to one another. Pump 110 is primarily responsible for supplying pressurized oil to header lift cylinders 16, cross-conveyor lift cylinder 26, and deflector lift cylinder 25a.

Pressurized fluid to cylinders 16, 25a and 26 is controlled by a bank of valves 116 situated between cylinders 16, 25a and 26 on the one hand and pump 110 on the other. Among other things, the bank of valves 116 includes a valve block 118 and a plurality of associated solenoid-controlled valves 120, 122, 124, 126, 128 and 130. Pressurized fluid from pump 110 enters block 118 via ports 132 and 134 and thence moves through various internal passages controlled by valves 120–130. An outlet port 136 supplies pressurized oil to deflector operating cylinder 25a via line 138, and a return line 140 from deflector operating cylinder 25a reconnects with block 118 at a return port 142. An outlet port 144 communicates with reservoir 108 via a return line 146, and a line 148 communicates reservoir 108 with pump 110.

An outlet port 150 supplies pressurized fluid to the header lift cylinders 16 via a line 152, a tee connection 154, and a line 156 leading from tee connection 154. Header lift cylinders 16 are connected in a master-slave relationship via an interconnect line 158 such that pressurized fluid from the rod end of one cylinder 16 communicates with the base end of the other cylinder 16. A return line 160 leads from the rod ends of the slave cylinder to a return port 162 in block 118, and thence to return line 146 via outlet port 144.

The tee connection 154 has, in addition to the line 156 to header lift cylinder 16, a supply line 164 leading therefrom to conveyor lift cylinder 26. Thus, in the illustrated embodiment, header lift cylinders 16 and conveyor lift cylinder 26 are connected in a parallel fluid flow relationship via tee connection 154 such that both receive pressurized oil simultaneously when outlet port 150 is activated by the internal valving of block 118. Obviously, conveyor lift cylinder 26 could be plumbed in the circuit in such a way that it does not operate simultaneously with header lift cylinders 16, without departing from the principles of the present invention. Conveyor lift cylinder 26 is a single acting cylinder that is extended under hydraulic pressure and retracted by gravity. More specifically, conveyor lift cylinder 26 is connected mechanically to cross-conveyor 20 in such a way that cylinder 26 is extended to raise cross-conveyor 20 but is then retracted by the weight of the cross-conveyor so as to allow it to move down to its lowered position.

A manual lock-out valve 166 is provided in line 164 for the purpose of allowing the operator to lock cylinder 26 in any degree of partial or full extension. This provides a safety function in the event the operator may need to perform a maintenance operation below the cross-conveyor. This lock-out also permits the operator to lock cross-conveyor 20 in the down position, yet hydraulically raise header 12 either partially or fully while operating in the field.

An electrically actuated solenoid valve 168, operable from the tractor cab, is provided in supply line 164 to permit the operator to remotely lock cross-conveyor 20 in the up position when it is not running. The same switch (not shown) for turning cross-conveyor 20 off and on also locks and unlocks solenoid valve 168. When cross-conveyor 20 is locked up and turned off, the stream of crop materials from header 14 may pass below it without interference.

Operation

For triple windrowing operations, the deflector 25 is maintained in its fully raised position by cylinder 25a (although in some situations deflector 25 may be used to "feather" and slightly direct the flow of crop materials exiting from the end of cross-conveyor 20). A suitable lock-out valve (not shown) may be provided within the hydraulic circuit 106 for maintaining the deflector 25 in such raised position for triple windrowing purposes. Alternatively, appropriate mechanical means (not shown) may also be used.

Figure 1B:
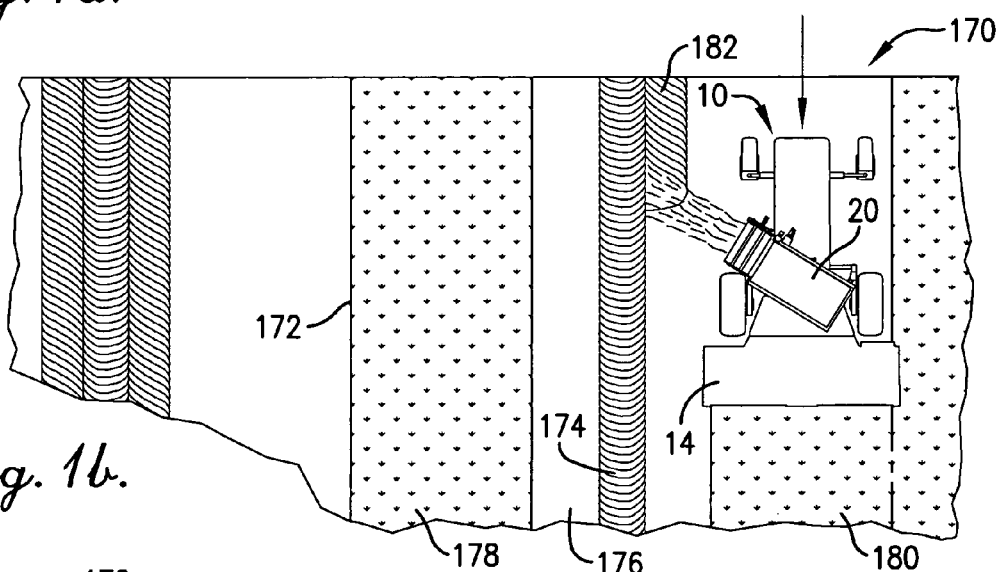
Figure 1C:
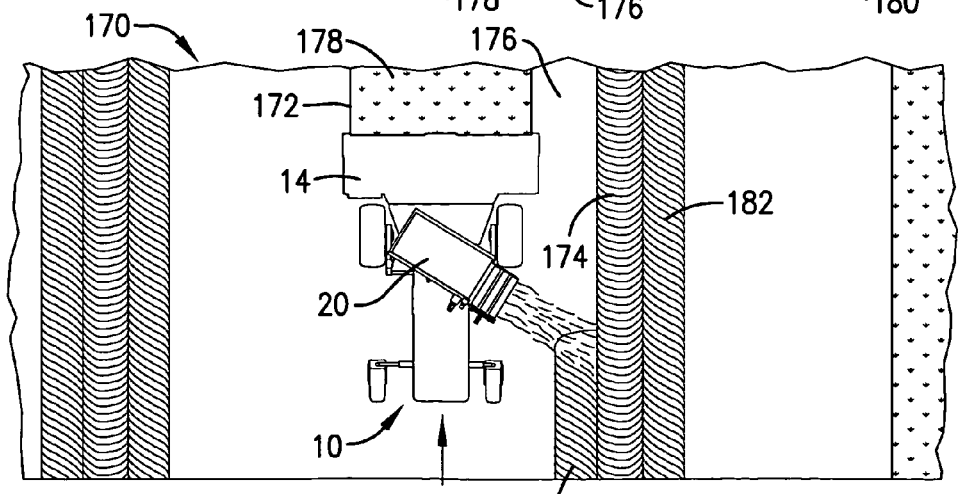

FIGS. 1a, 1b and 1c illustrate one embodiment of the triple windrowing method in accordance with the present invention and will now be referred to in describing such embodiment. FIG. 1a illustrates the harvester 10 making the first of three triple windrowing passes through a field of standing crop materials broadly denoted by the numeral 170. The standing materials in field 170 present a uncut edge 172 that runs alongside a previously mowed area of the field. As the operator prepares to make the first pass, he positions harvester 10 essentially one header width inwardly from edge 172, i.e., the distance between edge 172 and the left extremity of header 14 is no greater than the cutting width of header 14. With cross-conveyor 20 retained in its raised position by appropriate actuation of solenoid 168 and header 14 in its lowered position, the operator then moves forwardly, severing crop materials from the ground and projecting them rearwardly underneath raised cross-conveyor 20. Due to the raised condition of cross-conveyor 20, the stream of materials passes under the center of the tractor and cross-conveyor 20 and falls to the ground in a first windrow or ribbon-like deposit 174 in the strip 176 of mowed ground behind the advancing harvester 10. A band 178 of uncut standing crop materials is thus created along one side of mowed strip 176, while a normally larger body 180 of unmowed standing crop materials is presented on the other side.

At the end of the first pass, the operator will typically raise header 14 to turn the harvester around for commencement of the second pass. After turning around, the operator lowers both header 14 and cross-conveyor 20 down into their operating positions, with the harvester positioned to make a return cut through the main body of uncut crop materials 180, traveling in the opposite direction as illustrated in FIG. 1b. With cross-conveyor 20 lowered and operating, as harvester 10 advances back through the body of uncut materials 180 in the second pass, the stream of severed crop materials projected rearwardly from header 14 are intercepted by cross-conveyor 20, are conveyed laterally outwardly, and are projected into the mowed strip 176 from the first pass where they land on the ground in association with the first deposit 174. This creates a second ribbon, windrow or deposit 182 of crop materials in the mowed strip 176.

Upon completing the second harvesting pass, the operator typically raises header 14 and cross-conveyor 20 to turn the harvester around for making the third harvesting pass in the same direction as the original first pass. To commence the third pass, the operator lines up harvester 10 with the band 178 of uncut standing crop materials, lowers header 14 and cross-conveyor 20 to their operating positions, and starts moving through the band 178 as illustrated in FIG. 1c. Once again, as the severed crop materials are projected rearwardly by header 14, they are intercepted by cross-conveyor 20, are conveyed laterally outwardly, and are projected into the mowed strip 176 to lie generally alongside the first deposit 174, creating a third ribbon, windrow or deposit 184 in mowed strip 176. When the operator completes the third pass, a triple windrow consisting of the three deposits 174, 182 and 184 will have been formed.

It will be appreciated that the foregoing description of a triple windrowing method sets forth only one possible embodiment of the invention. Other embodiments are also possible within the scope of the present invention. For example, instead of having cross-conveyor 20 angled rearwardly to the right with its discharge end on the right side of harvester 10, it could be mounted at an opposite angle with its discharge end along the left side of the machine. If this is the case, the second pass of the triple windrowing procedure would not be made through the main remaining body of uncut crop 180, but would instead be made through the band 178. As the band 178 would be harvested, the severed materials would be projected out of the left side of the harvester 10, depositing the materials in a second windrow adjacent the first deposit. After finishing the second pass through band 178, the harvester would then make its third pass through the remaining main body 180 of standing materials, depositing the third deposit adjacent the first and second deposits. In both right and left-hand deliveries, the first pass would be made at a distance spaced inwardly from the uncut edge 172 of the field of standing material 170 with the first deposit being laid down beneath the center of the harvester within the mowed strip 176 as illustrated in FIG. 1a.

It will be appreciated that in carrying out the foregoing triple windrowing procedure, the severed crop materials must be projected further laterally than is necessary in a double windrowing process as disclosed in U.S. Pat. No. 6,415,590. The acceleration imparted to the materials as they leave main conveyor 21 and enter extension conveyor 22 is very helpful in this respect as the additional velocity of the materials gives them greater momentum to travel the necessary extra distance. Moreover, the upwardly angled relationship of the extension conveyor 22 with the discharge end of main conveyor 21 gives the accelerated materials additional loft to travel the required extra distance.

The preferred forms of the invention described above are to be used as illustration only, and should not be utilized in a limiting sense in interpreting the scop of the present invention. Obvious modifications to the exemplary embodiments, has hereinabove as set forth, could be readily made by those skilled in the art without departing from the spirit of the invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A harvesting method comprising:

making a first harvesting pass in one direction through a field of standing crop materials including severing standing materials from the ground and depositing them onto the ground within a mowed strip created by the first harvesting pass to form a first deposit of severed materials, said first harvesting pass being carried out at a location spaced inwardly from an edge of uncut standing crop materials so as to leave uncut standing crop materials along opposite sides of the mowed strip;

making a second harvesting pass in the opposite direction through uncut standing crop materials including severing standing materials from the ground and directing them laterally onto the ground within the mowed strip of the first pass to form a second deposit of severed materials in the mowed strip in association with the first deposit; and making a third harvesting pass in said one direction through uncut standing crop materials including severing standing materials from the ground and directing them laterally onto the ground within the mowed strip of the first pass to form a third deposit of severed materials in the mowed strip in association with the first and second deposits, said second and third passes being carried out with a cross-conveyor in a lowered position for receiving a stream of severed materials before they are returned to the ground after severance and for moving such materials in a lateral direction to the mowed strip of the first pass, said first pass being carried out with the cross-conveyor in a raised position for allowing the stream of severed materials to pass beneath the raised cross-conveyor and return to the ground in the mowed strip.

2. A harvesting method as claimed in claim 1, said first pass creating a band of uncut standing crop materials along one side of the mowed strip and a body of uncut standing crop materials along the other side of the mowed strip, said second pass being carried out through said body of uncut standing crop materials and said third pass being carried out through said band of uncut standing crop materials.

3. A harvesting method as claimed in claim 1, said step of conveying the materials in a lateral direction including moving the materials at a first speed for a predetermined distance during such conveyance and then accelerating the materials to a second faster speed before they leave the cross-conveyor.

4. A harvesting method as claimed in claim 3, further comprising the step of directing the severed materials upwardly before they leave the cross-conveyor.

5. A harvesting method as claimed in claim 1, further comprising the step of directing the severed materials upwardly before they leave the cross-conveyor.

6. A harvesting method as claimed in claim 5, said step of conveying the materials in a lateral direction including moving the materials at a first speed for a predetermined distance during such conveyance and then accelerating the materials to a second faster speed before they leave the cross-conveyor.

7. A harvesting method comprising:

making a first harvesting pass in one direction through a field of standing crop materials including severing standing materials from the ground and depositing them onto the ground within a mowed strip created by the first harvesting pass to form a first deposit of severed materials, said first harvesting pass being carried out at a location spaced inwardly from an edge of uncut standing crop materials so as to leave uncut standing crop materials along opposite sides of the mowed strip;

making a second harvesting pass in the opposite direction through uncut standing crop materials on one side of the mowed strip of the first pass including severing standing materials from the ground and directing them lateraliy onto the ground within the mowed strip of the first pass to form a second deposit of severed materials in the mowed strip in association with the first deposit; and making a third harvesting pass in said one direction through uncut standing crop materials on the opposite side of the mowed strip of the first pass including severing standing materials from the ground and directing them lateraliy onto the ground within the mowed strip of the first pass to form a third deposit of severed materials in the mowed strip in association with the first and second deposits.

* * * * *

UNITED STATES PATENT AND TRADEMARK OFFICE
CERTIFICATE OF CORRECTION

PATENT NO. : 7,028,459 B2  Page 1 of 1
APPLICATION NO. : 10/752640
DATED : April 18, 2006
INVENTOR(S) : Randy Lohrentz, Dwight E. Nickel and Ben G. Nolt It is certified that error appears in the above-identified patent and that said Letters Patent is hereby corrected as shown below:

First page of patent, line (73), change "ACCO Corporation" to "AGCO Corporation."

Signed and Sealed this

Eighth Day of August, 2006

JON W. DUDAS
*Director of the United States Patent and Trademark Office*